United States Patent
Singleton

(10) Patent No.: US 11,481,423 B1
(45) Date of Patent: Oct. 25, 2022

(54) APPARATUS AND METHOD FOR DELIVERING AUGMENTED REALITY CONTENT ASSOCIATED WITH A SCANNED OBJECT

(71) Applicant: Strax Networks, Inc., Round Hill, VA (US)

(72) Inventor: Eric Singleton, Round Hill, VA (US)

(73) Assignee: Strax Networks, Inc., Round Hill, VA (US)

( * ) Notice: Subject to any disclaimer, the term of this patent is extended or adjusted under 35 U.S.C. 154(b) by 0 days.

(21) Appl. No.: 17/143,678

(22) Filed: Jan. 7, 2021

Related U.S. Application Data

(60) Provisional application No. 62/958,000, filed on Jan. 7, 2020.

(51) Int. Cl.
*G06F 16/432* (2019.01)
*G06F 16/41* (2019.01)
*G06T 19/00* (2011.01)

(52) U.S. Cl.
CPC ............ *G06F 16/434* (2019.01); *G06F 16/41* (2019.01); *G06T 19/006* (2013.01)

(58) Field of Classification Search
None
See application file for complete search history.

(56) References Cited

U.S. PATENT DOCUMENTS

| | | | | |
|---|---|---|---|---|
| 2020/0375666 | A1* | 12/2020 | Murphy | A61B 90/16 |
| 2021/0019944 | A1* | 1/2021 | McKeever | H04L 67/38 |
| 2021/0374199 | A1* | 12/2021 | Reda | G06F 16/9535 |
| 2021/0374875 | A1* | 12/2021 | Davis | G06T 19/006 |

* cited by examiner

*Primary Examiner* — Yi Wang
(74) *Attorney, Agent, or Firm* — Cooley LLP

(57) ABSTRACT

A non-transitory computer readable storage medium has instructions executed by a processor to receive via a network an uploaded image from an augmented reality posting machine. The uploaded image is indexed to form an indexed uploaded image. Augmented reality experience parameters are collected from the augmented reality posting machine via the network. The augmented reality experience parameters are associated with the indexed uploaded image. An uploaded video is received via the network. The uploaded video is encoded to a video stream format. The video stream format is associated with the indexed uploaded image and the augmented reality experience parameters to form an augmented reality experience object. A scanned image is received from an augmented reality client machine. The scanned image is matched with the indexed uploaded image to initiate execution of the augmented reality experience object to form a video stream conveyed via the network to the augmented reality client machine.

10 Claims, 4 Drawing Sheets

_US 11,481,423 B1_

APPARATUS AND METHOD FOR DELIVERING AUGMENTED REALITY CONTENT ASSOCIATED WITH A SCANNED OBJECT

CROSS-REFERENCE TO RELATED APPLICATION

This application claims priority to U.S. Provisional Patent Application Ser. No. 62/958,000, filed Jan. 7, 2020, the contents of which are incorporated herein by reference.

FIELD OF THE INVENTION

This invention relates generally to communications in computer networks. More particularly, this invention is directed toward techniques for delivering augmented reality content associated with a scanned object.

BACKGROUND OF THE INVENTION

Augmented reality refers to a real-world environment that is enhanced by computer generated information, such as visual and auditory information. Individuals with sophisticated technical skills have created augmented reality experiences in very limited contexts. There is a need to allow individuals with limited technical skills to create augmented reality experiences in unlimited contexts.

SUMMARY OF THE INVENTION

A non-transitory computer readable storage medium has instructions executed by a processor to receive via a network an uploaded image from an augmented reality posting machine. The uploaded image is indexed to form an indexed uploaded image. Augmented reality experience parameters are collected from the augmented reality posting machine via the network. The augmented reality experience parameters are associated with the indexed uploaded image. An uploaded video is received via the network. The uploaded video is encoded to a video stream format. The video stream format is associated with the indexed uploaded image and the augmented reality experience parameters to form an augmented reality experience object. A scanned image is received from an augmented reality client machine. The scanned image is matched with the indexed uploaded image to initiate execution of the augmented reality experience object to form a video stream conveyed via the network to the augmented reality client machine.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
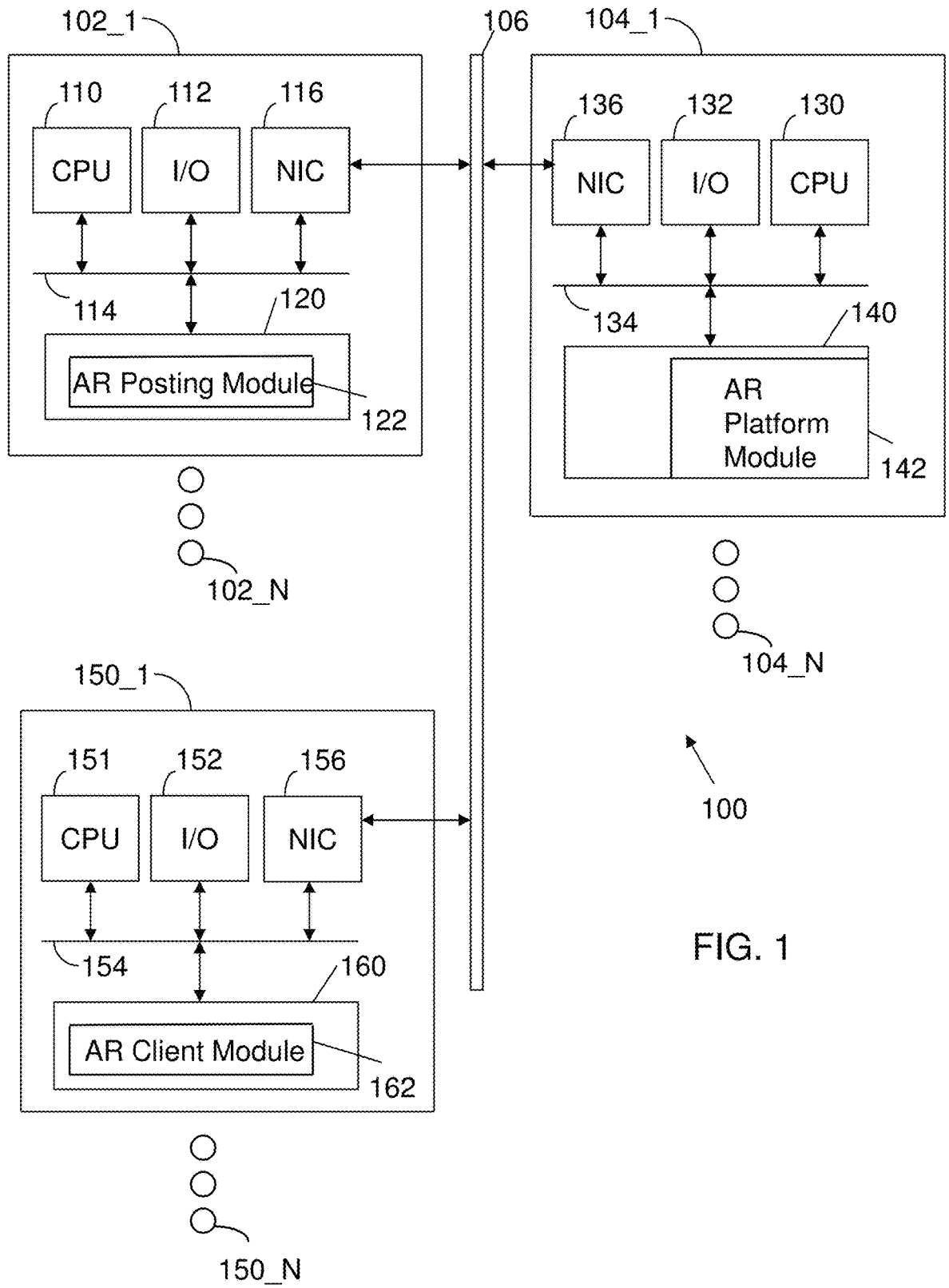
FIG. 1 illustrates a network configured in accordance with an embodiment of the invention.

FIG. 1 illustrates a network 100 with a set of augmented reality posting machines 102_1 through 102_N in communication with a set of augmented reality platform machines 104_1 through 104_N via a network 106, which may be any combination of wired and wireless networks. Also connected to network 106 is a set of augmented reality client machines 150_1 through 150_N. The augmented reality posting machines 102_1 through 102_N are used to create augmented reality experiences that are hosted by augmented reality platform machines 104_1 through 104_N. The augmented reality experiences are executed on augmented reality client machines 150_1 through 150_N.

Augmented reality posting machine 102_1 includes a processor (e.g., central processing unit or CPU) 110 in communication with input/output devices 112 via a bus 114. The input/output devices 112 may include a keyboard, mouse, touch display and the like. A network interface circuit 116 is also connected to bus 114 to provide connectivity to network 106. A memory 120 is also connected to bus 114. The memory 120 stores instructions executed by processor 110 to implement operations disclosed herein. In particular, memory 120 stores an augmented reality posting module 122 with instructions executed by processor 110 to prompt a user to coordinate content used in an augmented reality experience. The augmented reality posting module 122 may locally generate prompts and pass information to one or more machines 104_1 through 104_N. Alternately, machines 104_1 through 104_N may initiate prompts that are displayed by the augmented reality posting module 122.

Augmented reality platform machine 104_1 includes a processor 130, input/output devices 132, bus 134 and network interface circuit 136. A memory 140 is connected to bus 134. Memory 140 stores an augmented reality platform module 142 with instructions executed by processor 130 to implement augmented reality hosting operations disclosed herein.

Augmented reality client machine 150_1 includes a processor 151, input/output devices 152, a bus 154 and network interface circuit 156. A memory 160 is connected to bus 154. The memory stores an augmented reality client module 162 with instructions executed by processor 151 to implement operations disclosed herein.

Figure 2:
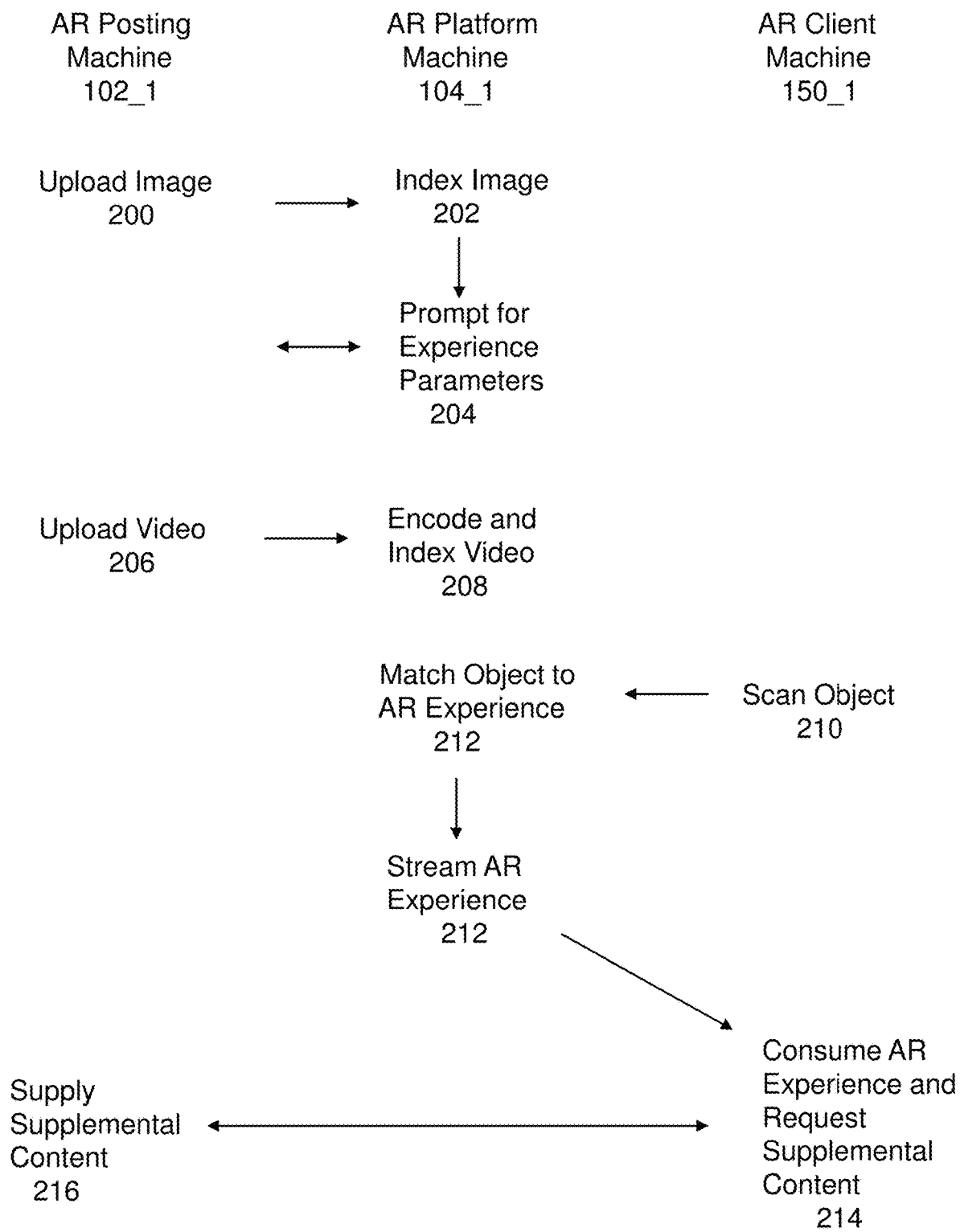
FIG. 2 illustrates processing operations performed between machines shown in FIG. 1.

FIG. 2 illustrates processing operations performed by the augmented reality posting machine 102_1, the augmented reality platform machine 104_1 and the augmented reality client machine 150_1. Initially, the augmented reality posting machine 102_1 uploads an image 200 to the augmented reality platform machine 104_1. By way of example, the image 200 may be a JPEG, PDF or scanned image of any real-world item, such as an individual, an object, a brand and the like. Subsequently, the image is used as a code that is associated with an augmented reality experience. After an object is scanned by an augmented reality client machine 150_1, the augmented reality platform matches the scanned object with the uploaded image to fetch an augmented reality experience that is delivered to the client machine 150_1.

The augmented reality platform machine 104_1 indexes the image 202. For example, the image may be indexed in a database and be associated with additional parameters. The additional parameters may be prompted by the augmented reality platform machine 104_1. As shown in FIG. 2, the augmented reality platform machine 104_1 sends prompts to augmented reality posting machine 102_1 for experience options 204, examples of which are provided below. The prompts may include a prompt to upload a video 206. The video may be the augmented reality experience. The augmented reality experience may also include auditory content, haptic content and the like. The augmented platform machine 104_1 encodes and indexes the video 208. The encoding operation may include the encoding of a set of videos associated with one or more images. For example, different videos may be designated for different demographics or customer bases. That is, a scanned image may result in different virtual reality experiences for different demographics or customer bases.

The augmented reality client machine 150_1 scans an object 210, which is uploaded to the augmented reality platform machine 104_1. The scanned object may be a real-world object, an image on a computer screen, a frame of a video, and the like.

The augmented reality platform module 142 matches the scanned object to the augmented reality experience 212. The augmented reality experience may be characterized by an augmented reality experience object that specifies a video stream format and augmented reality experience parameters. The augmented reality platform machine 104_1 subsequently streams the augmented reality experience 212.

The augmented reality client machine 150_1 consumes the augmented reality experience 214. The augmented reality experience may include a link to supplemental content, which may be fetched by the augmented reality client machine 150_1 from the augmented reality posting machine 102_1, which supplies the supplemental content 216. The supplemental content may be automatically retrieved or may be retrieved in response to a user command, such as activating a network link.

Figure 3:
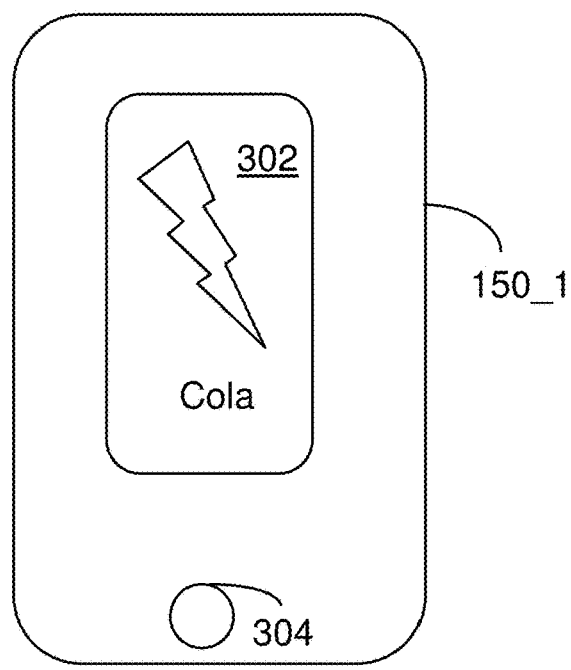
FIG. 3 illustrates a client device scanning an object.

FIG. 3 illustrates a client device 150_1 in the form of a mobile device, which uses its camera to capture an image 302 by activating button 304. The image 302 is sent over network 106 to augmented reality platform machine 104_1. The augmented reality platform module 142 matches the image to an augmented reality experience, which is delivered to the client device 150_1. In one embodiment, the augmented reality experience is streamed to the client device 150_1, as opposed to downloading a file to the client device 150_1.

Figure 4:
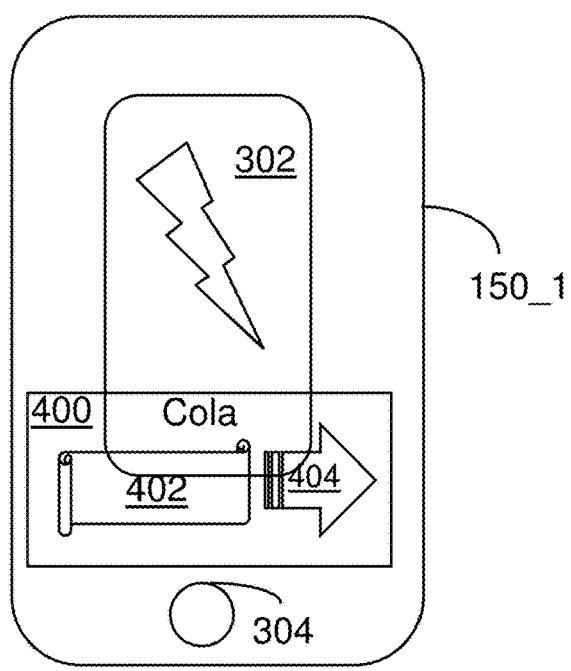
FIG. 4 illustrates a client device displaying augmented reality content in association with the scanned object.

FIG. 4 illustrates client device 150_1 with image 302 supplemented by an augmented reality experience 400, which in this case includes streamed media content 402 and a link 404 to supplemental content. The supplemental content may be a website with additional information on the image and/or the augmented reality experience. The augmented reality experience may be directly associated with or pinned to the scanned image. Alternately, the augmented reality experience may be completely separate or unpinned from the scanned image. For example, the user may scan an image and then move the client machine 150_1 away from the image and simply watch the augmented reality experience on the client machine 150_1 without the scanned image present.

Figure 5:
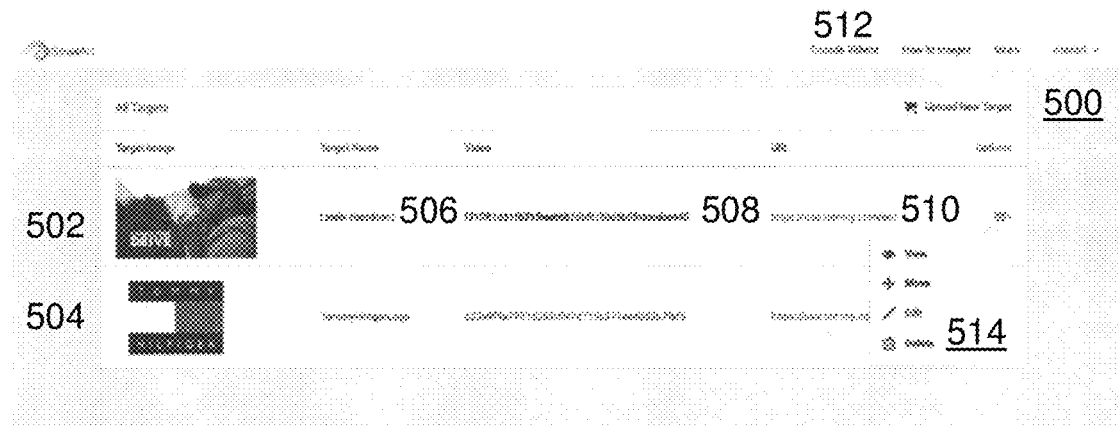
FIG. 5 illustrates an interface for processing augmented reality objects.

FIG. 5 illustrates an interface 500 supplied by augmented reality platform module 142. The interface 500 includes target images 502 and 504. Target image 502 has an associated target name 506, video name 508 and a uniform resource locator 510. There is a prompt 512 to encode a video. Menu 514 includes different options to view, move, edit and delete a video. The video is accessed at address 508. URL 510 is the location for the supplemental content that is available to the user after the augmented reality experience. Menu 514 facilitates easy object manipulation across folders.

Figure 6:
FIG. 6 illustrates an interface with prompts to construct an augmented reality experience.

FIG. 6 illustrates an interface 600 supplied by augmented reality platform module 142. The interface 600 includes a prompt 602 to upload a video file. Display parameters for the video 604, may include whether the augmented reality experience should be pinned to the scanned object or be unpinned or disassociated with the scanned object. The interface 600 also includes a prompt to upload metadata for the virtual reality experience. The metadata may include a content type and a URL.

In one embodiment, the uploaded video is in the form of MP4, MOV or WEBM files, which are converted to HLS, DASH or Transparency file formats. The transcoded file may be compressed to form a .zip archive file.

The augmented reality platform module 142 includes instructions executed by processor 130 to create a file and folder system that enables the user to catalog, store and move augmented reality experiences across multiple folders without having to recreate them each time so the management of the different augmented reality experiences is in a convenient arrangement for the end user.

The augmented reality platform module 142 includes instructions executed by processor 130 to maintain data regarding each augmented reality asset and each user of an augmented reality client machine. Thus, real-time data analytics for each augmented reality asset and user are available to the augmented reality posting entity.

Those skilled in the art will appreciate that the disclosed technology may be used at a point of purchase to allow a consumer to obtain more information about a product that has been scanned. Alternately, the disclosed technology may be used at a concert or sporting event to obtain more information about the performer or team and then provide access to merchandise promoted by the performer or team.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium with instructions executed by a processor to:
   receive via a network an uploaded image from an augmented reality posting machine;
   index the uploaded image to form an indexed uploaded image;
   collect from the augmented reality posting machine, via the network, augmented reality experience parameters;
   associate the augmented reality experience parameters with the indexed uploaded image;
   receive via the network an uploaded video from the augmented reality posting machine;
   encode the uploaded video to a video stream format;
   compress the video stream format to form a compressed video stream format;
   associate the compressed video stream format with the indexed uploaded image and the augmented reality experience parameters to form an augmented reality experience object;
   receive via the network a scanned image from an augmented reality client machine; and
   match the scanned image with the indexed uploaded image to initiate execution of the augmented reality experience object to form a video stream conveyed via the network to the augmented reality client machine, wherein the video stream includes directions to either associate the video stream with the scanned image or disassociate the video stream from the scanned image.

2. The non-transitory computer readable storage medium of claim 1 wherein the augmented reality experience parameters include a command to associate the video stream with the scanned image.

3. The non-transitory computer readable storage medium of claim 1 wherein the augmented reality experience parameters include a command to disassociate the video stream with the scanned image.

4. The non-transitory computer readable storage medium of claim 1 wherein the augmented reality experience parameters include a link to supplemental content associated with the scanned image.

5. The non-transitory computer readable storage medium of claim 4 wherein the link to supplemental content is automatically accessed.

6. The non-transitory computer readable storage medium of claim 4 wherein the link to supplemental content is accessed in response to a user action.

7. The non-transitory computer readable storage medium of claim 1 wherein the augmented reality experience parameters specify different video streams for different users capturing the same scanned image.

8. The non-transitory computer readable storage medium of claim 1 further comprising instructions executed by the processor to move the augmented reality experience object from a first folder to a second folder.

9. The non-transitory computer readable storage medium of claim 1 further comprising instructions executed by the processor to move the video stream format from a first folder to a second folder.

10. The non-transitory computer readable storage medium of claim 1 further comprising instructions executed by the processor to move the augmented reality experience parameters from a first folder to a second folder.

\* \* \* \* \*